(12) United States Patent
Witalis et al.

(10) Patent No.: US 11,306,654 B2
(45) Date of Patent: *Apr. 19, 2022

(54) GAS TURBINE ENGINE SYSTEM WEAR REDUCTION

(71) Applicant: United Technologies Corporation, Farmington, CT (US)

(72) Inventors: Stephen A. Witalis, Glastonbury, CT (US); Ramesh Rajagopalan, Glastonbury, CT (US); Subhradeep Chowdhury, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,290

(22) Filed: Nov. 26, 2019

(65) Prior Publication Data

US 2020/0200127 A1 Jun. 25, 2020

Related U.S. Application Data (60) Provisional application No. 62/781,744, filed on Dec. 19, 2018.

(51) Int. Cl.
*F02C 6/08* (2006.01)
*F02C 9/42* (2006.01)
*F02C 9/28* (2006.01)

(52) U.S. Cl.
CPC .................. *F02C 6/08* (2013.01); *F02C 9/42* (2013.01); *F02C 9/28* (2013.01); *F05D 2260/96* (2013.01); *F05D 2270/071* (2013.01)

(58) Field of Classification Search
None
See application file for complete search history.

(56) References Cited

U.S. PATENT DOCUMENTS

| 4,541,237 A * | 9/1985 | Dickey | F02C 9/28 |
| | | | 60/39.281 |
| 6,253,537 B1 | 7/2001 | Suenaga et al. | |
| 7,980,509 B2 * | 7/2011 | Bhargava | B64C 25/405 |
| | | | 244/50 |

(Continued)

FOREIGN PATENT DOCUMENTS

EP  3611360 A1  2/2020

OTHER PUBLICATIONS

EP Application No. 19218339.0 Extended EP Search Report dated May 13, 2020, 6 pages.

(Continued)

*Primary Examiner* — Katheryn A Malatek
(74) *Attorney, Agent, or Firm* — Cantor Colburn LLP (57) ABSTRACT

An engine system for an aircraft includes a first gas turbine engine, a second gas turbine engine, and a control system. The control system is configured to operate the first gas turbine engine with an idle fuel burn schedule in a taxi mode of the aircraft and operate the second gas turbine engine with a sub-idle fuel burn schedule in the taxi mode of the aircraft. The sub-idle fuel burn schedule includes a reduction of the idle fuel burn schedule. A fuel flow of the first gas turbine engine and the second gas turbine engine is increased above the idle fuel burn schedule prior to takeoff of the aircraft.

20 Claims, 4 Drawing Sheets

(56) References Cited

U.S. PATENT DOCUMENTS

| | | |
|---|---|---|
| 8,820,046 B2 | 9/2014 | Ross et al. |
| 8,955,334 B2 | 2/2015 | Hansen et al. |
| 9,664,070 B1 | 5/2017 | Clauson et al. |
| 10,040,577 B2 | 8/2018 | Teicholz et al. |
| 10,125,636 B2 | 11/2018 | Dube et al. |
| 10,125,691 B2 | 11/2018 | Feulner et al. |
| 10,174,678 B2 | 1/2019 | Schwarz et al. |
| 10,208,629 B2 | 2/2019 | Jackowski et al. |
| 10,221,774 B2 | 3/2019 | Gelwan et al. |
| 10,358,936 B2 | 7/2019 | Hockaday et al. |
| 10,436,064 B2 | 10/2019 | Savela |
| 10,443,507 B2 | 10/2019 | Schwarz et al. |
| 10,539,079 B2 | 1/2020 | Schwarz et al. |
| 10,718,231 B2 | 7/2020 | Orkiszewski |
| 10,760,498 B2 | 9/2020 | Cannella et al. |
| 10,781,754 B2 | 9/2020 | Chiasson et al. |
| 10,801,371 B2 | 10/2020 | Chauson et al. |
| 10,823,014 B2 | 11/2020 | Steen |
| 11,015,659 B2 | 5/2021 | Sethi et al. |
| 11,073,086 B2 | 7/2021 | Brown et al. |
| 2008/0190094 A1 | 8/2008 | Kauf et al. |
| 2013/0031912 A1 | 2/2013 | Finney et al. |
| 2014/0145863 A1 | 5/2014 | Cottet et al. |
| 2014/0373553 A1 | 12/2014 | Zaccaria et al. |
| 2015/0244296 A1* | 8/2015 | Edwards ................. F01D 15/10 290/40 B |
| 2017/0009662 A1* | 1/2017 | Corpron ................. B64D 27/10 |
| 2017/0369180 A1 | 12/2017 | Jones et al. |
| 2018/0023413 A1 | 1/2018 | Chowdhury et al. |
| 2018/0320600 A1 | 11/2018 | Lamarre et al. |
| 2018/0334963 A1 | 11/2018 | Fernholz et al. |
| 2020/0200099 A1 | 6/2020 | Rajagopalan et al. |

OTHER PUBLICATIONS

EP Application No. 19218341.6 Extended EP Search Report dated May 15, 2020, 6 pages.

* cited by examiner

GAS TURBINE ENGINE SYSTEM WEAR REDUCTION

CROSS-REFERENCE TO RELATED APPLICATION

This application claims the benefit of priority to U.S. Provisional Application No. 62/781,744 filed Dec. 19, 2018, the disclosure of which is incorporated herein by reference in its entirety.

BACKGROUND

The subject matter disclosed herein generally relates to gas turbine engines and, more particularly, to a method and an apparatus for gas turbine engine system wear reduction.

Gas turbine engines are used in numerous applications, one of which is for providing thrust to an aircraft. Gas turbine engines are typically operated while the aircraft is on the ground, such as during taxiing from a gate prior to takeoff and taxiing back to the gate after landing. Gas turbine engines are typically operated at an idle level to warm engine subsystems, operate accessory subsystems, and keep the aircraft in a ready state. In some instances, on-ground operation at idle can be for extended periods of time, particularly at busy airports. The on-ground operation at idle can result in sustained periods of non-flight fuel burn and contributes to engine wear as well as associated operating noise, tire wear, brake wear, and fuel-burn emissions.

BRIEF DESCRIPTION

According to one embodiment, an engine system for an aircraft includes a first gas turbine engine, a second gas turbine engine, and a control system. The control system is configured to operate the first gas turbine engine with an idle fuel burn schedule in a taxi mode of the aircraft and operate the second gas turbine engine with a sub-idle fuel burn schedule in the taxi mode of the aircraft. The sub-idle fuel burn schedule includes a reduction of the idle fuel burn schedule. A fuel flow of the first gas turbine engine and the second gas turbine engine is increased above the idle fuel burn schedule prior to takeoff of the aircraft.

In addition to one or more of the features described above or below, or as an alternative, further embodiments may include where the control system is further configured to transition the second gas turbine engine from the sub-idle fuel burn schedule to the idle fuel burn schedule in a prepare-for-takeoff mode prior to acceleration of the first gas turbine engine and the second gas turbine engine for takeoff of the aircraft.

In addition to one or more of the features described above or below, or as an alternative, further embodiments may include where the control system is further configured to operate the first gas turbine engine with the sub-idle fuel burn schedule based on detecting landing of the aircraft, and operate the second gas turbine engine with the idle fuel burn schedule based on detecting landing of the aircraft.

In addition to one or more of the features described above or below, or as an alternative, further embodiments may include where the control system is further configured to alternate a designation of the first gas turbine engine and the second gas turbine engine between two or more gas turbine engines of the aircraft.

In addition to one or more of the features described above or below, or as an alternative, further embodiments may include where the control system is further configured to track a sub-idle time of the two or more gas turbine engines and alternate the designation of the first gas turbine engine and the second gas turbine engine to substantially balance the sub-idle time of the two or more gas turbine engines for the aircraft.

In addition to one or more of the features described above or below, or as an alternative, further embodiments may include where at least one engine bleed schedule is adjusted corresponding to the sub-idle fuel burn schedule to control a compressor work distribution during sub-idle operation.

In addition to one or more of the features described above or below, or as an alternative, further embodiments may include where adjustment to the at least one engine bleed schedule increases an engine bleed flow to at least one environment control system of the aircraft during sub-idle operation.

In addition to one or more of the features described above or below, or as an alternative, further embodiments may include where the control system includes one or more of an engine controller and an aircraft controller.

According to another embodiment, a gas turbine engine for an aircraft includes a fan section, a compressor section operably coupled to the fan section, a combustor section, a turbine section operably coupled to the compressor section, and an engine controller. The engine controller is configured to meter a fuel flow to the combustor section according to an idle fuel burn schedule in a first taxi mode of the aircraft and meter the fuel flow to the combustor section according to a sub-idle fuel burn schedule in a second taxi mode of the aircraft. The sub-idle fuel burn schedule includes a reduction of the idle fuel burn schedule.

In addition to one or more of the features described above or below, or as an alternative, further embodiments may include where the first taxi mode includes a taxi-to-flight-line mode prior to takeoff of the aircraft, and the second taxi mode includes a taxi-to-gate mode after landing of the aircraft.

In addition to one or more of the features described above or below, or as an alternative, further embodiments may include where the first taxi mode includes a taxi-to-gate mode after landing of the aircraft, and the second taxi mode includes a taxi-to-flight-line mode prior to takeoff of the aircraft.

In addition to one or more of the features described above or below, or as an alternative, further embodiments may include where the engine controller is further configured to transition from the sub-idle fuel burn schedule to the idle fuel burn schedule in a prepare-for-takeoff mode prior to acceleration for takeoff of the aircraft.

In addition to one or more of the features described above or below, or as an alternative, further embodiments may include where the engine controller is further configured to adjust at least one engine bleed schedule of the compressor section corresponding to the sub-idle fuel burn schedule to control a compressor work distribution during sub-idle operation of the gas turbine engine.

According to another embodiment, a method of gas turbine engine system control includes operating a first gas turbine engine with an idle fuel burn schedule in a taxi mode of an aircraft and operating a second gas turbine engine with a sub-idle fuel burn schedule in the taxi mode of the aircraft. The sub-idle fuel burn schedule includes a reduction of the idle fuel burn schedule. The method also includes increasing a fuel flow of the first gas turbine engine and the second gas turbine engine above the idle fuel burn schedule prior to takeoff of the aircraft.

In addition to one or more of the features described above or below, or as an alternative, further embodiments may include transitioning the second gas turbine engine from the sub-idle fuel burn schedule to the idle fuel burn schedule in a prepare-for-takeoff mode prior to acceleration of the first gas turbine engine and the second gas turbine engine for takeoff of the aircraft.

In addition to one or more of the features described above or below, or as an alternative, further embodiments may include operating the first gas turbine engine with the sub-idle fuel burn schedule based on detecting landing of the aircraft, and operating the second gas turbine engine with the idle fuel burn schedule based on detecting landing of the aircraft.

In addition to one or more of the features described above or below, or as an alternative, further embodiments may include alternating a designation of the first gas turbine engine and the second gas turbine engine between two or more gas turbine engines of the aircraft.

In addition to one or more of the features described above or below, or as an alternative, further embodiments may include tracking a sub-idle time of the two or more gas turbine engines and alternate the designation of the first gas turbine engine and the second gas turbine engine to substantially balance the sub-idle time of the two or more gas turbine engines for the aircraft.

In addition to one or more of the features described above or below, or as an alternative, further embodiments may include adjusting at least one engine bleed schedule corresponding to the sub-idle fuel burn schedule to control a compressor work distribution during sub-idle operation.

In addition to one or more of the features described above or below, or as an alternative, further embodiments may include where adjusting the at least one engine bleed schedule increases an engine bleed flow to at least one environment control system of the aircraft during sub-idle operation.

A technical effect of the apparatus, systems and methods is achieved by sequencing control of gas turbine engine system idle and sub-idle operation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
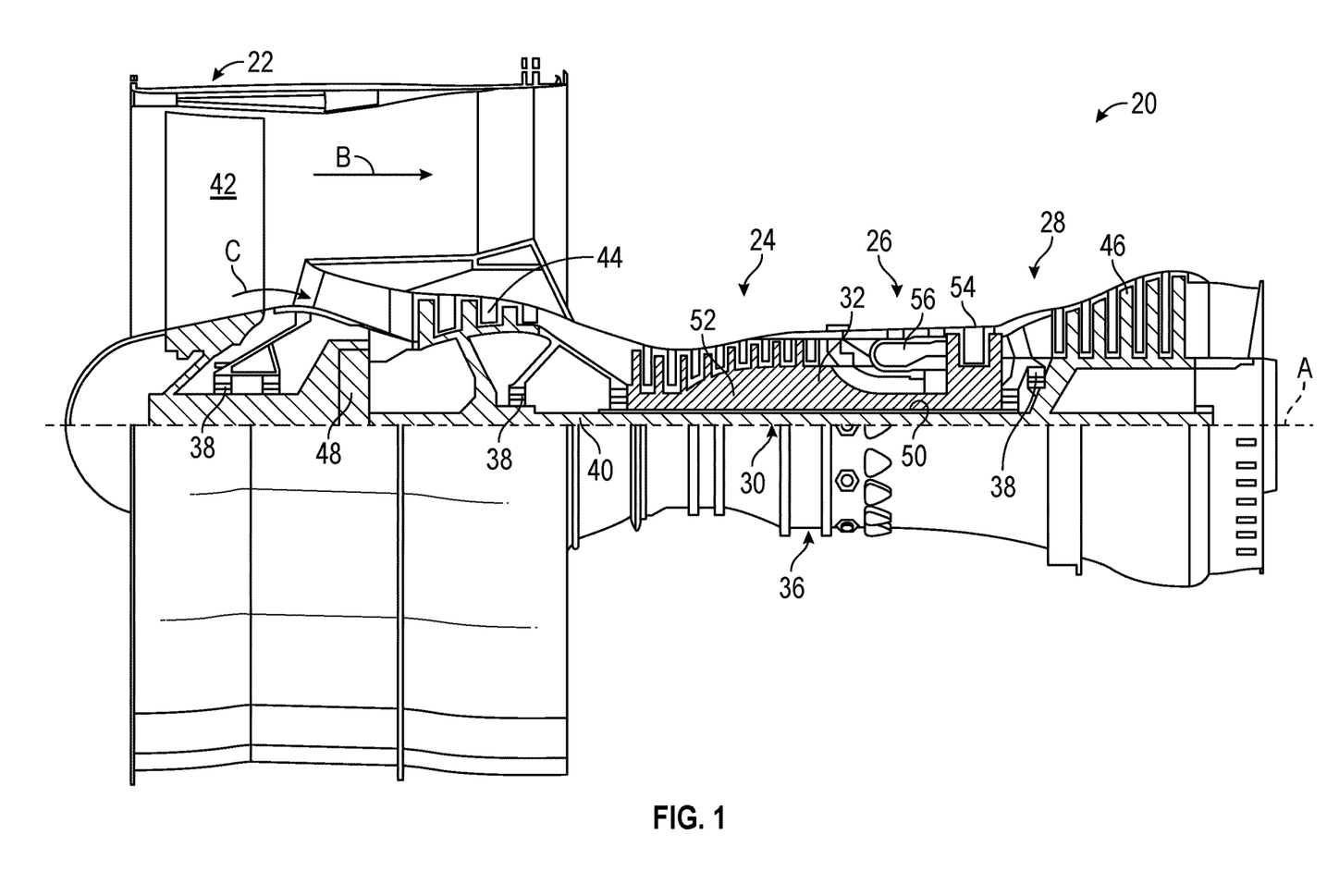
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single-spool and three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications.

Figure 2:
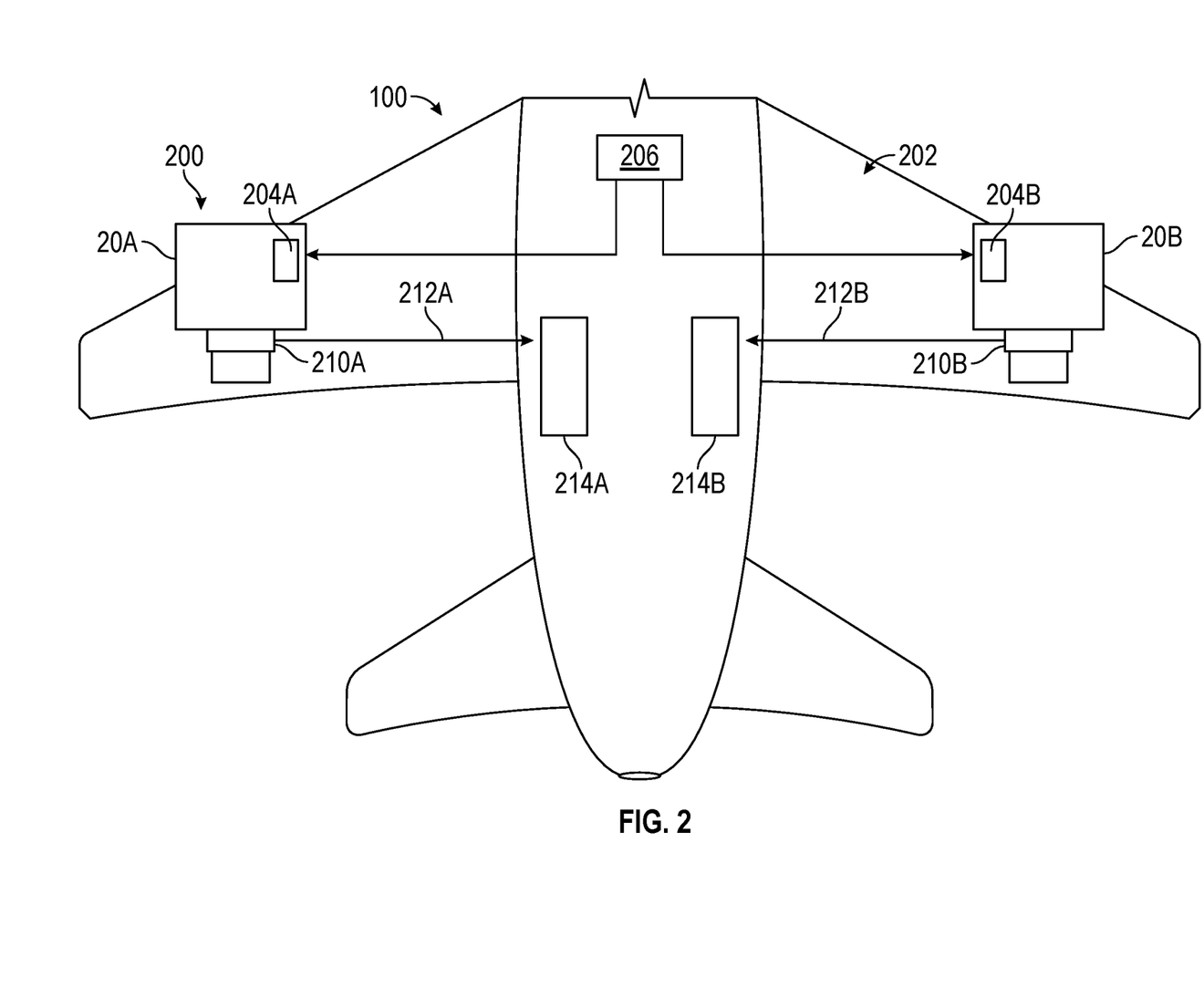
FIG. 2 is a schematic diagram of an engine system of an aircraft, in accordance with an embodiment of the disclosure.

Referring now to FIG. 2, a schematic illustration of an aircraft 100 includes an engine system 200 with first and second gas turbine engines 20A, 20B as embodiments of the gas turbine engine 20 of FIG. 1. Although the engine system 200 is depicted with two gas turbine engines 20, it will be understood that the engine system 200 can include additional gas turbine engines (e.g., three or more instances of the gas turbine engine 20 on the aircraft 100). Each of the first and second gas turbine engines 20A, 20B can have an associated engine controller 204A, 204B. The engine controllers 204A, 204B can receive commands and data from an aircraft controller 206 of the aircraft 100. Collectively, the engine controllers 204A, 204B and aircraft controller 206 may be referred to as a control system 202. Control logic and command generation can be implemented by any portion of the control system 202 and may be distributed, for example, between the engine controllers 204A, 204B and/or aircraft controller 206. The aircraft controller 206 may receive pilot inputs and control multiple aspects of the aircraft 100. The engine controllers 204A, 204B can be embodied in one or more full authority digital engine controls (FADECs), for example.

The engine controllers 204A, 204B and aircraft controller 206 can each include memory to store instructions that are executed by one or more processors on one or more channels. The executable instructions may be stored or organized in any manner and at any level of abstraction, such as in connection with a controlling and/or monitoring operation of the first and second gas turbine engines 20A, 20B. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In the example of FIG. 2, the engine controllers 204A, 204B can meter a fuel flow to the combustor section 26 (FIG. 1) of respective gas turbine engines 20A, 20B based on a current operating mode of the aircraft 100 according to one or more fuel burn schedules. For example, the engine controllers 204A, 204B can meter a fuel flow to the combustor section 26 according to an idle fuel burn schedule in a first taxi mode of the aircraft 100 and meter the fuel flow to the combustor section 26 according to a sub-idle fuel burn schedule in a second taxi mode of the aircraft 100, where the sub-idle fuel burn schedule can be a reduction of the idle fuel burn schedule. For instance, a sub-idle fuel burn schedule may result in 50% to 80% of the nominal idle engine speed as compared to the idle fuel burn schedule. The application of the sub-idle fuel burn schedule and idle fuel burn schedule can alternate between the gas turbine engines 20A, 20B, such that at least one of the gas turbine engines 20A, 20B is operating at idle while the other is operating at sub-idle. The gas turbine engine 20A, 20B operating at a slower sub-idle speed can benefit from reduced fuel burn (resulting in reduced noise and exhaust emissions) and reduced component wear, which may extend component service life. The reduced total thrust output during taxi operations by operating at least one of the gas turbine engines 20A, 20B at sub-idle speed can also result in reduced aircraft brake wear and tire wear while increasing brake life and tire life. Alternating sub-idle operation between the gas turbine engines 20A, 20B can substantially balance the sub-idle time and associated benefits for the gas turbine engines 20A, 20B.

Sub-idle operation may be considered a significantly off-design mode of operation as compared to typical idle operation. Accordingly, sub-idle operation can cause a missmatch in compressor work distribution. One or more engine bleeds 210A, 210B of the gas turbine engines 20A, 20B can be controlled to extract an engine bleed flow 212A, 212B and increase a stability margin of the compressor section 24 (FIG. 1). The engine controllers 204A, 204B can have at least one engine bleed schedule that is adjusted corresponding to the sub-idle fuel burn schedule to control a compressor work distribution during sub-idle operation. Adjustment to the engine bleed schedules can increase the engine bleed flow 212A, 212B to at least one environment control system 214A, 214B of the aircraft 100 during sub-idle operation. For example, while gas turbine engine 20A is in sub-idle operation with the engine controller 204A using a sub-idle fuel burn schedule, the engine controller 204A can make or apply a corresponding adjustment to an engine bleed schedule that increases the engine bleed flow 212A from the engine bleed 210A to environment control system 214A that provides conditioned and pressurized air to a cabin or compartment of the aircraft 100. Similarly, when gas turbine engine 20B is in sub-idle operation with the engine controller 204B using a sub-idle fuel burn schedule, the engine controller 204B can make or apply a corresponding adjustment to an engine bleed schedule that increases the engine bleed flow 212B from the engine bleed 210B to environment control system 214B that provides conditioned and pressurized air to a cabin or compartment of the aircraft 100. Further details and examples are provided with respect to FIGS. 3 and 4.

Figure 3:
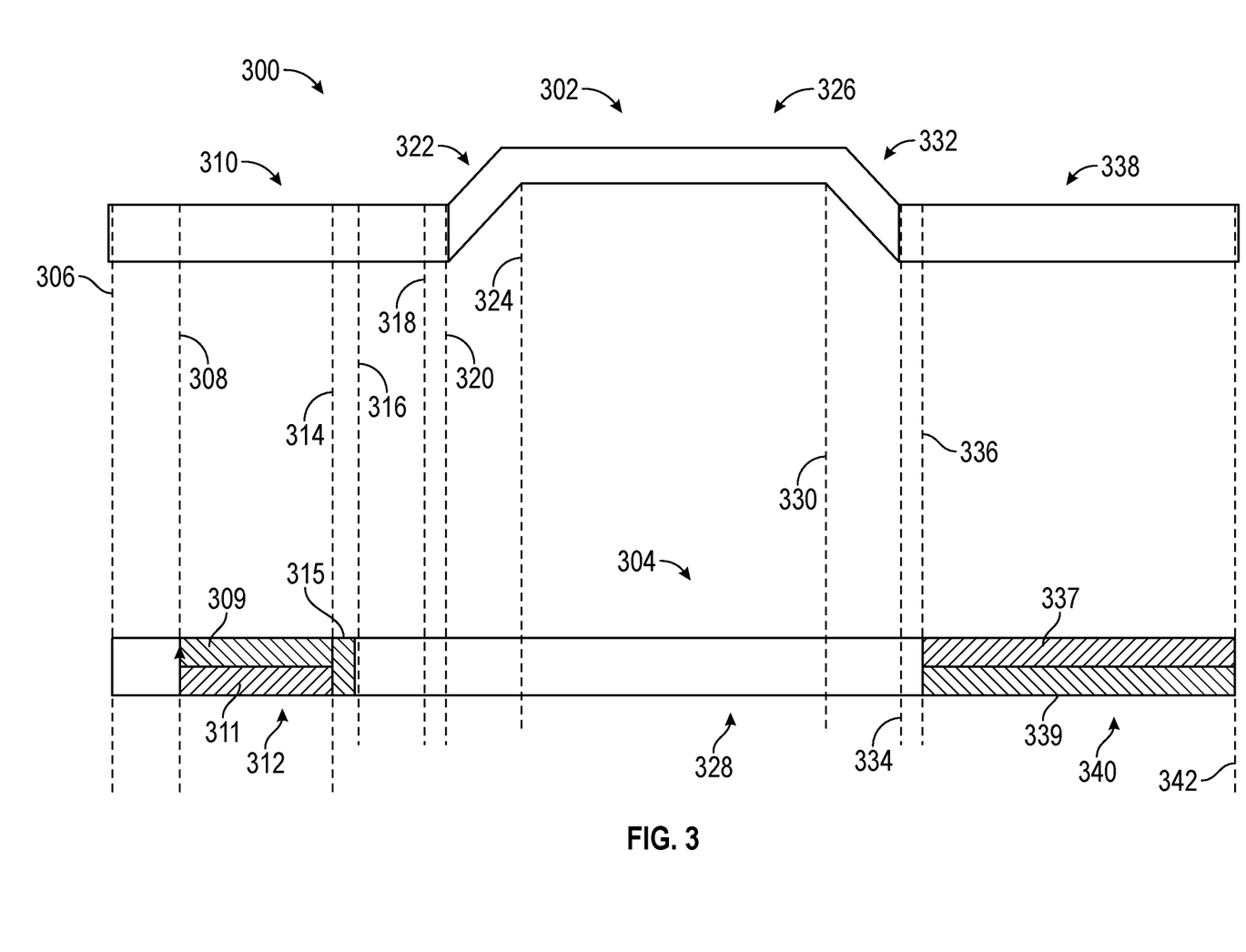
FIG. 3 is a sequence diagram for operation of an aircraft and engine system, in accordance with an embodiment of the disclosure.

FIG. 3 depicts a sequence diagram 300 for an aircraft sequence 302 and an engine system sequence 304 with further reference to FIGS. 1-2. Time progresses from left to right on FIG. 3 and is not to scale; rather, the sequence diagram 300 is a sequential illustration for purposes of explanation.

In the example of FIG. 3, a pushback event 306 of the aircraft 100 can be performed, for instance, while the engines 20A, 20B are depowered. An engine start event 308 can start all engines (e.g., gas turbine engines 20A, 20B) of the aircraft 100. In the two-engine example of FIG. 2, a first gas turbine engine 20A can be configured to set an engine speed to idle operation 309 with an idle fuel burn schedule in a taxi mode of the aircraft 100 as part of a taxi-to-takeoff sequence 310 for the aircraft 100 and a taxi-to-flight-line mode 312 for the engine system 200. The second gas turbine engine 20B can be configured to set an engine speed to sub-idle operation 311 with a sub-idle fuel burn schedule in the taxi mode of the aircraft 100 during the taxi-to-flight-line mode 312. The aircraft 100 can transition to a prepare-for-takeoff mode 314 prior to acceleration 316 of the first gas turbine engine 20A and the second gas turbine engine 20B for takeoff 318 of the aircraft 100. The prepare-for-takeoff mode 314 can be reached, for example, when the aircraft 100 nears a takeoff position on or near a runway and can include transitioning the second gas turbine engine 20B from the sub-idle fuel burn schedule to the idle fuel burn schedule for duel engine idle operation 315. The sub-idle operation of the second gas turbine engine 20B can preheat components and reduce thermal expansion times needed for the second gas turbine engine 20B to be ready for takeoff 318.

The aircraft 100 can start to climb 320 and progress through a climb phase 322, transition 324 to a cruise phase 326 with the gas turbine engines 20A, 20B at cruise power 328, transition 330 to a descend phase 332, and transition 334 to a taxi-to-gate phase 338 on the ground. Based on detecting landing 336 of the aircraft 100 (e.g., detecting weight-on-wheels), the gas turbine engines 20A, 20B can be set to an opposite state as at the engine start event 308. For example, the first gas turbine engine 20A can be operated with the sub-idle fuel burn schedule for sub-idle operation 337 based on detecting landing 336 of the aircraft 100, and the second gas turbine engine 20B can be operated with the idle fuel burn schedule for idle operation 339 based on detecting landing 336 of the aircraft 100. The first and second gas turbine engines 20A, 20B can maintain different fuel flow schedules in a taxi-to-gate mode 340 after landing 336 of the aircraft 100, for instance, until engine shutdown 342.

In the example of FIG. 3, the taxi-to-flight-line mode 312 is an example of a first taxi mode of the aircraft 100 and the taxi-to-gate mode 340 is example of a second taxi mode of the aircraft 100. Alternatively, the taxi mode designations can be reversed, where the taxi-to-gate mode 340 is the first taxi mode and the taxi-to-flight-line mode 312 is the second taxi mode. Further, the designations of the first gas turbine engine 20A and the second gas turbine engine 20B can alternate between two or more gas turbine engines 20 of the aircraft 100. For instance, gas turbine engine 20A may be operated with the sub-idle fuel burn schedule while gas turbine engine 20B is operated with the idle fuel burn schedule during the taxi-to-flight-line mode 312, and gas turbine engine 20A may be operated with the idle fuel burn schedule while gas turbine engine 20B is operated with the sub-idle fuel burn schedule during taxi-to-gate mode 340. The process can be expanded to include additional pairs of gas turbine engines 20 alternating between idle and sub-idle fuel burn schedules (e.g., a first and third engine at idle while a second and fourth engine are at sub-idle in a four-engine example).

To further balance wear between gas turbine engines 20A, 20B, the control system 202 may track a sub-idle time of the two or more gas turbine engines 20A, 20B and alternate the designation of the first gas turbine engine 20A and the second gas turbine engine 20B to substantially balance the sub-idle time of the two or more gas turbine engines 20A, 20B for the aircraft 100 over multiple flights. For instance, if time spent in the taxi-to-flight-line mode 312 is substantially longer than the time spent in the taxi-to-gate mode 340, alternating designations can further balance engine wear. Alternatively, the designations of the first gas turbine engine 20A and the second gas turbine engine 20B may remain substantially fixed, e.g., always start left engine at idle and right engine at sub-idle, then alternate upon landing 336.

Figure 4:
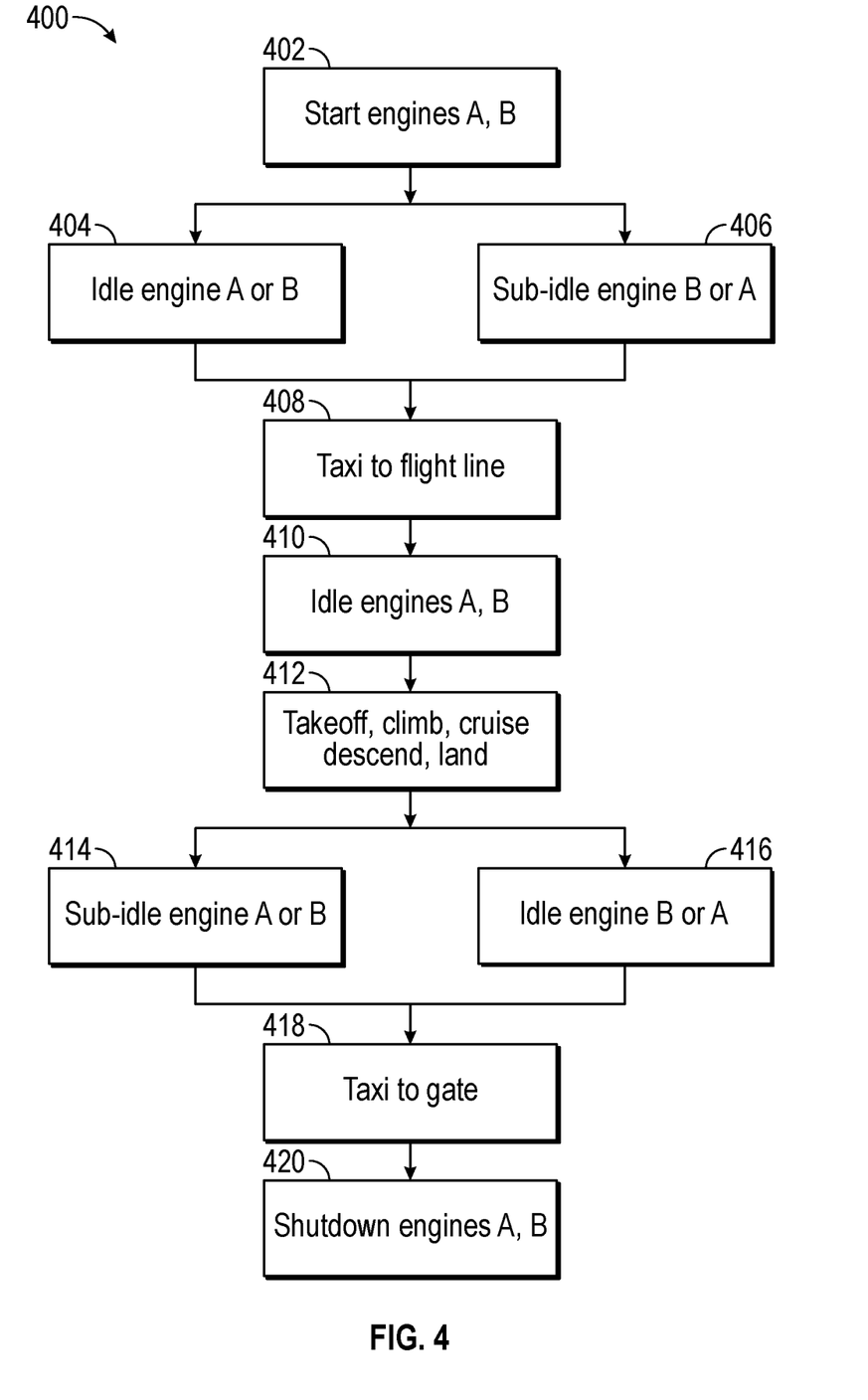
FIG. 4 is a flow chart illustrating a method, in accordance with an embodiment of the disclosure.

Referring now to FIG. 4 with continued reference to FIGS. 1-3, FIG. 4 is a flow chart illustrating a method 400 of engine system control in accordance with an embodiment. The method 400 may be performed, for example, by the engine system 200 of FIG. 2. For purposes of explanation, the method 400 is described primarily with respect to the engine system 200 of FIG. 2; however, it will be understood that the method 400 can be performed on other configurations (not depicted).

At block 402, the control system 202 can start the first gas turbine engine 20A and the second gas turbine engine 20B. At block 404, the control system 202 can operate the first gas turbine engine 20A with an idle fuel burn schedule in a taxi mode (e.g., taxi-to-flight-line mode 312) of the aircraft 100. In parallel, at block 406, the control system 202 can operate the second gas turbine engine 20B with a sub-idle fuel burn schedule in the taxi mode of the aircraft 100. The control system 202 can also adjust at least one engine bleed schedule corresponding to the sub-idle fuel burn schedule to control a compressor work distribution during sub-idle operation of the second gas turbine engine 20B.

At block 408, the aircraft 100 can taxi to a flight line as part of a taxi-to-takeoff sequence 310. At block 410, control system 202 can transition the second gas turbine engine 20B from the sub-idle fuel burn schedule to the idle fuel burn schedule in prepare-for-takeoff mode 314 prior to acceleration of the first gas turbine engine 20A and the second gas turbine engine 20B for takeoff 318 of the aircraft 100. The control system 202 can increase a fuel flow of the first gas turbine engine 20A and the second gas turbine engine 20B above the idle fuel burn schedule prior to takeoff 318 of the aircraft 100. At block 412, the aircraft 100 transitions through takeoff 318, a climb phase 322, a cruise phase 326, a descend phase 332, and landing 336.

At block 414, the control system 202 can operate the first gas turbine engine 20A with the sub-idle fuel burn schedule based on detecting landing 336 of the aircraft 100. In parallel, at block 416, the control system 202 can operate the second gas turbine engine 20B with the idle fuel burn schedule based on detecting landing 336 of the aircraft 100. The control system 202 can also adjust at least one engine bleed schedule corresponding to the sub-idle fuel burn schedule to control a compressor work distribution during sub-idle operation of the first gas turbine engine 20A, for instance, to increase an engine bleed flow 212A to at least one environment control system 214A of the aircraft 100 during sub-idle operation.

At block 418, the aircraft 100 can continue with a taxi-to-gate phase 338 on the ground, for instance, until reaching a gate or other destination. At block 420, engine shutdown 342 can depower both the first gas turbine engine 20A and the second gas turbine engine 20B.

Also, while the above description describes a process for a twin engine aircraft, a similar procedure can be applied to aircraft with more than two engines. For example, in the case of more than two engines, more than one engine (e.g., one or more additional gas turbine engine 20) may be operated at sub-idle during taxiing.

While the above description has described the flow process of FIG. 4 in a particular order, it should be appreciated that unless otherwise specifically required in the attached claims that the ordering of the steps may be varied. Further, the designation of the first and second gas turbine engines 20A, 20B can be arbitrary and need not map to a particular engine (e.g., left or right) as the designations can change such that at least one of the gas turbine engines 20A, 20B operates at a sub-idle speed during a portion of taxi operations.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine system for an aircraft, the engine system comprising:
   a first gas turbine engine;
   a second gas turbine engine;
   a control system configured to:
   operate the first gas turbine engine with an idle fuel burn schedule in a taxi mode of the aircraft;
   operate the second gas turbine engine with a sub-idle fuel burn schedule in the taxi mode of the aircraft, the sub-idle fuel burn schedule comprising a reduction of the idle fuel burn schedule; and
   increase a fuel flow of the first gas turbine engine and the second gas turbine engine above the idle fuel burn schedule prior to takeoff of the aircraft.

2. The engine system of claim 1, wherein the control system is further configured to:
   transition the second gas turbine engine from the sub-idle fuel burn schedule to the idle fuel burn schedule in a prepare-for-takeoff mode prior to acceleration of the first gas turbine engine and the second gas turbine engine for takeoff of the aircraft.

3. The engine system of claim 1, wherein the control system is further configured to:
   operate the first gas turbine engine with the sub-idle fuel burn schedule based on detecting landing of the aircraft; and
   operate the second gas turbine engine with the idle fuel burn schedule based on detecting landing of the aircraft.

4. The engine system of claim 1, wherein the control system is further configured to alternate a designation of the first gas turbine engine and the second gas turbine engine between two or more gas turbine engines of the aircraft.

5. The engine system of claim 4, wherein the control system is further configured to track a sub-idle time of the two or more gas turbine engines and alternate the designation of the first gas turbine engine and the second gas turbine engine to substantially balance the sub-idle time of the two or more gas turbine engines for the aircraft.

6. The engine system of claim 1, wherein at least one engine bleed schedule is adjusted corresponding to the sub-idle fuel burn schedule to control a compressor work distribution during sub-idle operation.

7. The engine system of claim 6, wherein adjustment to the at least one engine bleed schedule increases an engine bleed flow to at least one environment control system of the aircraft during sub-idle operation.

8. The engine system of claim 1, wherein the control system comprises one or more of an engine controller and an aircraft controller.

9. The engine system of claim 1, wherein the first gas turbine engine comprises:
   a fan section;
   a compressor section operably coupled to the fan section;
   a combustor section;
   a turbine section operably coupled to the compressor section; and
   an engine controller configured to:
   meter a fuel flow to the combustor section according to the idle fuel burn schedule in a first taxi mode of the aircraft; and
   meter the fuel flow to the combustor section according to the sub-idle fuel burn schedule in a second taxi mode of the aircraft.

10. The engine system of claim 9, wherein the first taxi mode comprises a taxi-to-flight-line mode prior to takeoff of the aircraft and the second taxi mode comprises a taxi-to-gate mode after landing of the aircraft.

11. The engine system of claim 9, wherein the first taxi mode comprises a taxi-to-gate mode after landing of the aircraft and the second taxi mode comprises a taxi-to-flight-line mode prior to takeoff of the aircraft.

12. The engine system of claim 11, wherein the engine controller is further configured to transition from the sub-idle fuel burn schedule to the idle fuel burn schedule in a prepare-for-takeoff mode prior to acceleration for takeoff of the aircraft.

13. The engine system of claim 9, wherein the engine controller is further configured to adjust at least one engine bleed schedule of the compressor section corresponding to the sub-idle fuel burn schedule to control a compressor work distribution during sub-idle operation of the first gas turbine engine.

14. A method of controlling an engine system of an aircraft, the method comprising:
- operating, by a control system, a first gas turbine engine of the engine system with an idle fuel burn schedule in a taxi mode of the aircraft;
- operating, by the control system, a second gas turbine engine of the engine system with a sub-idle fuel burn schedule in the taxi mode of the aircraft, the sub-idle fuel burn schedule comprising a reduction of the idle fuel burn schedule; and
- increasing, by the control system, a fuel flow of the first gas turbine engine and the second gas turbine engine above the idle fuel burn schedule prior to takeoff of the aircraft.

15. The method of claim 14, further comprising:
- transitioning the second gas turbine engine from the sub-idle fuel burn schedule to the idle fuel burn schedule in a prepare-for-takeoff mode prior to acceleration of the first gas turbine engine and the second gas turbine engine for takeoff of the aircraft.

16. The method of claim 14, further comprising:
- operating the first gas turbine engine with the sub-idle fuel burn schedule based on detecting landing of the aircraft; and
- operating the second gas turbine engine with the idle fuel burn schedule based on detecting landing of the aircraft.

17. The method of claim 14, further comprising:
- alternating a designation of the first gas turbine engine and the second gas turbine engine between two or more gas turbine engines of the aircraft.

18. The method of claim 17, further comprising:
- tracking a sub-idle time of the two or more gas turbine engines and alternate the designation of the first gas turbine engine and the second gas turbine engine to substantially balance the sub-idle time of the two or more gas turbine engines for the aircraft.

19. The method of claim 14, further comprising:
- adjusting at least one engine bleed schedule corresponding to the sub-idle fuel burn schedule to control a compressor work distribution during sub-idle operation.

20. The method of claim 19, wherein adjusting the at least one engine bleed schedule increases an engine bleed flow to at least one environment control system of the aircraft during sub-idle operation.

* * * * *